United States Patent [19]

Dammann

[11] Patent Number: 4,826,617

[45] Date of Patent: May 2, 1989

[54] SELECTIVE RESIN SYNTHESIS AND DUAL FUNCTIONAL RESINS MADE THEREBY

[75] Inventor: Laurence G. Dammann, Westerville, Ohio

[73] Assignee: Ashland Oil, Inc., Ashland, Ky.

[21] Appl. No.: 114,096

[22] Filed: Oct. 27, 1987

Related U.S. Application Data

[62] Division of Ser. No. 919,076, Oct. 15, 1986, Pat. No. 4,732,945.

[51] Int. Cl.[4] .............................................. C08L 63/00
[52] U.S. Cl. .................................... 525/107; 524/350; 524/384; 525/109; 525/194; 525/208; 525/403
[58] Field of Search ...................... 525/107, 109, 327.3, 525/384, 403, 194; 523/350, 384

[56] References Cited

U.S. PATENT DOCUMENTS

| | | | |
|---|---|---|---|
| 3,096,315 | 7/1963 | Tinsley | 525/327.3 |
| 3,277,036 | 12/1966 | Whitworth, Jr. | 525/327.3 |
| 4,390,675 | 6/1983 | Gruber | 526/273 |

Primary Examiner—Christopher Henderson
Attorney, Agent, or Firm—Mueller and Smith

[57] ABSTRACT

Disclosed is a new partial capping synthesis wherein resinous mixtures containing controlled amounts of phenolic hydroxyl and/or mercapto functionality, and aliphatic hydroxyl functionality are synthesized. Such synthesis comprises providing one or more resins which in total contain aliphatic primary and/or secondary hydroxyl functionality and oxirane functionality. A single resin or blend of resins may provide the requisite functionality. The one or more resins then are reacted with a carboxyl-functional capping agent bearing phenolic hydroxyl functionality and/or mercapto functionality. This reaction is conducted under reaction conditions and for a time such that the carboxyl functionality of the capping agent selectively reacts with the oxirane functionality of the one or more resins to produce a resinous product containing aliphatic hydroxyl functionality and containing phenolic hydroxyl functionality and/or mercapto functionality.

11 Claims, No Drawings

SELECTIVE RESIN SYNTHESIS AND DUAL FUNCTIONAL RESINS MADE THEREBY

This application is a division of application Ser. No. 919,076, filed Oct. 15, 1986, now U.S. Pat. No. 4,732,945.

BACKGROUND OF THE INVENTION

The present invention relates to the synthesis of resins and more particularly to a selective resin synthesis and the resulting dual functional resins made thereby.

Vapor permeation curable coatings traditionally are a class of coatings formulated from aromatic hydroxyl-functional polymers and multi-isocyanate cross-linking agents wherein an applied film thereof is cured by exposure to a vaporous tertiary amine catalyst. In order to contain and handle the vaporous tertiary amine catalyst economically and safely, curing chambers were developed. Curing chambers typically are substantially empty boxes through which a conveyor bearing the coated substrate passes and in which the vaporous tertiary amine, normally borne by an inert gas carrier, contacts such coated substrate. The use of aromatic hydroxy-functional polymers is recommended if an extended pot life system is required. If two-pack formulations are acceptable, then use of aliphatic hydroxyl-functional resins can be made. Multi-isocyanate cross-linking agents in traditional vapor permeation curable coatings contain at least some aromatic isocyanate groups in order for practical cure rates to be achieved.

Such traditional vapor permeation curable coatings requirements have been altered to a degree by the vaporous amine catalyst spray method disclosed by Blegen in U.S. Pat. No. 4,517,222. Such vapors catalyst spray method relies on the concurrent generation of an atomizate of a coating composition and a carrier gas bearing a catalytic amount of a vaporous tertiary amine catalyst. Such generated atomizate and vaporous catalytic amine-bearing carrier gas flow are admixed and directed onto a substrate to form a film thereover. Curing is rapid and use of a curing chamber is not required. Moreover, all aliphatic isocyanate curing agents can be utilized in such spray process. Aromatic hydroxyl groups on the resin, however, still are required.

One drawback to the requirement of aromatic hydroxyl groups on the resin is the inherent limitation which such aromaticity provides in formulating high solids coatings. The same is true of the requirement of aromaticity in the multi-isocyanate cross-linking agent. Such non-volatile solids content restriction even applies to the vaporous amine catalyst spray method described above.

Yet, despite the foregoing limitations which arise by virtue of the use of phenolic hydroxyl groups, aliphatic hydroxyl groups are not sufficiently responsive to vapor permeation cure to permit early film development. That is, a prime advantage of vapor permeation curable coatings is that they rapidly develop very early film properties so that the coated part can be handled on the coatings line without fear of damage to the coating. Over the long term, aliphatic hydroxyl groups will fully cure with the polyisocyanate cross-linking agents, though extended cure times means that early handling of the coated part is lost. Thus, it would appear that a suitable blend of phenolic hydroxyl groups and aliphatic hydroxyl groups would permit early film development, yet the formulation of higher solids, and higher performance coatings.

With respect to traditional polyester polyols taught in the vapor permeation curable coatings art, partial capping (partial capping for present purposes comprehending the formation of a resinous mixture containing both phenolic hydroxyl groups and aliphatic hydroxyl groups) of polyesters sometimes can be accomplished through direct esterification of aliphatic hydroxyl-functional polyesters with phenolic-functional carboxylic acids. This technique has limited applicability since the higher reaction temperatures (about 180° C. or above), requirement for acid catalyst, and long reaction times cause many side reactions to occur. Sometimes, it is a race to get the acid value down (e.g. below 10) before gelation of the reaction mixture occurs. When this technique is applied to higher functional aliphatic hydroxyl-functional acrylic resins, the resulting partially capped acrylic resinous product cannot be made reproducably on a large scale. Moreover, the esterification process produces water which must be azeotropically removed from the resinous mixture. Since such partial capping esterification has relatively slow reaction kinetics, a good azeotroping solvent (e.g. toluene or xylene) must be removed by vacuum distillation upon completion of the capping sequence. Accordingly, a more general and useful partial capping synthesis technique would be quite useful in the vapor permeation curable coatings as well as in other fields of endeavor.

BROAD STATEMENT OF THE INVENTION

Broadly, the present invention is directed to a new partial capping synthesis wherein resinous mixtures containing controlled amounts of phenolic hydroxyl and/or mercapto functionality, and aliphatic hydroxyl functionality are synthesized. Such synthesis comprises providing one or more resins which in total contain aliphatic primary and/or secondary hydroxyl functionality and oxirane functionality. A single resin or a blend of resins may provide the requisite functionality. The one or more resins then are reacted with a carboxyl-functional capping agent bearing phenolic hydroxyl functionality and/or mercapto functionality. This reaction is conducted under reaction conditions and for a time such that the carboxyl functionality of the capping agent selectively reacts with the oxirane functionality of the one or more resins to produce a resinous product containing aliphatic hydroxyl functionality and containing phenolic hydroxyl functionality and/or mercapto functionality.

Another aspect of the present invention is an aliphatic hydroxyl-functional resinous product which contains linkages represented by:

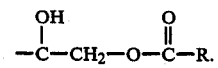

The R group bears phenolic hydroxy and/mercapto functionality. The ester linkage was formed by the selective capping with a carboxyl capping agent of an oxirane group to the substantial exclusion of said aliphatic hydroxyl functionality.

Advantages of the present invention include the ability to synthesize a rresinous product containing both aliphatic hydroxyl functionality and containing phenolic hydroxyl and/or mercapto functionality. A further advantage is that the synthesis is readily controlled and is readily reproducable on a large commercial scale. A further advantage is a resinous product which is ideally suited for use in vapor permeation curable coatings formulations. These and other advantages will be readily apparent to those skilled in the art based upon the disclosure contained herein.

DETAILED DESCRIPTION OF THE INVENTION

As discussed above, partially capped resins are useful in coatings formulations for improving durability and quite often to increase the solids of the coatings formulations. The key is to provide sufficient phenolic hydroxyl or mercapto functionality to give early development of film properties upon exposure to tertiary amine vapors in the presence of isocyanate cross-linkers. The aliphatic hydroxyl groups, then, cure more slowly over time with the isocyanate. The capping of acrylic resins (acrylic resins being illustrative rather than a limitation on the invention) through epoxy groups with carboxyl-functional phenols is a known reaction technique involving the heating of the epoxy-functional acrylic resin with the carboxyl capping agent at moderate temperatures for a short reaction time. No water is generated by the reaction; however, partial capping is not feasible because the epoxy residue comprises secondary aliphatic hydroxyl groups which are sterically hindered by the capping agent. Such sterically hindered hydroxyl groups are very unresponsive to amine-catalyzed cure with isocyanate groups.

The present invention, then, involves the discovery that carboxyl-functional capping agents bearing phenol and/or mercapto groups can be selectively reacted with epoxy groups in the presence of primary and/or secondary aliphatic hydroxyl groups. The reaction is reproducable, even at commercial scale operations, and the distribution of functionality can be regulated quite closely. The first stage of the resin synthesis involves providing one or more resins which in total contain aliphatic primary and/or secondary hydroxyl functionality and oxirane functionality. A single resin can be synthesized containing both functionalities, the functionalities may be provided by different resins, one functionality can be provided by a resin and the second functionality provided by a continuous phase diluent, or combinations of the above.

The selective resin synthesis can be represented diagrammatically as follows:

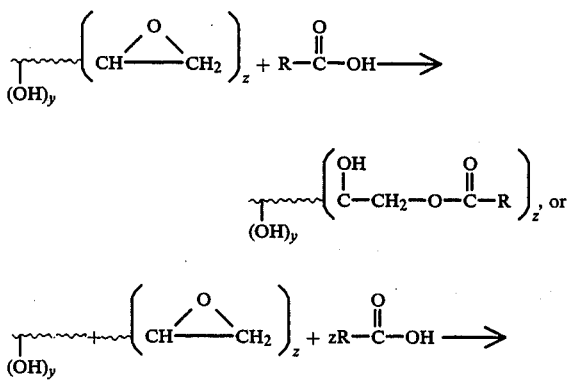

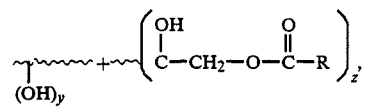

where R bears mercapto functionality or aromatic hydroxyl functionality (e.g. phenol). The wavy lines represent an organic chain (usually a polymer chain) which usually is composed of carbon with branching and substitution (e.g. oxygen) permitted in conventional fashion. In the above formulae, y and z are integers independently ranging from 1 to about 40. Further, the oxirane groups need not be terminal as shown in the formulae but can be internal in which case the polymer chain would continue, e.g.

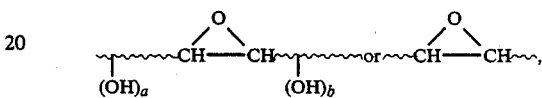

where a+b are integers ranging from 0 to 40. Of course, z total oxirane groups (internal, terminal, or a combination) will be present in the resinous mixture. Of importance is the selective reaction which permits an aliphatic hydroxyl resin to be enriched with a controlled amount of mercapto or phenol functionality.

With respect to a single resin bearing both aliphatic hydroxyl functionality and epoxy functionality, acrylic resins can be readily synthesized containing both such functionalities. The hydroxy functionality, for example, can be provided by a hydroxy acrylate or methacrylate monomer, e.g. hydroxy ethyl acrylate, or the like. The epoxy functionality can be provided, for example, by glycidyl acrylate, glycidyl methacrylate, allyl glycidyl ether, alpha-olefin epoxides, 1,4-butanediol diglycidyl ether, diglycidyl ethers of bis-phenol A, and the like. Additional acrylic monomers suitable for use in synthesizing the acrylic resins include, for example, butyl acrylate, amyl acrylate, lauryl acrylate, isobutyl acrylate, butyl methacrylate, stearyl methacrylate, decyl methacrylate, cyclohexyl methacrylate, methyl methacrylate, isobornyl acrylate and methacrylate diethylene glycol dimethacrylate, propylene glycol dimethacrylate, 1,3-butanediol diacrylate, diethylene glycol diacrylate, ethylene glycol diacrylate, polyethylene glycol diacrylate, tetraethylene glycol diacrylate, and the like and mixtures thereof. The foregoing monomers are merely representative and not limitative of the list of acrylate and methacrylate monomers suitable for use in the present invention as those skilled in the art will appreciate. Minor amounts of styrene, vinyl toluene, and like monomers also may be included. Other suitable reactive compounds include, for example, acrylated epoxy resins, acrylated silicon resins, acrylated polysulfide/polysulfone resins, acrylated polyurethane resins, and the like and mixtures thereof. Again, such acrylate-functional polymers are well known in the art.

As an alternative for providing acrylic polyol resins, it also is possible to epoxidize polyol resins by conventional epoxidizing techniques. Suitable epoxy compounds include internal epoxy compounds, various alicyclic epoxides, and terminal epoxides such as glycidyl-containing compounds. Suitable epoxidizing material include, for example, epichlorhydrin, diglycidyl ether of bisphenol A, 1,4-butanediol diglycidyl ether, dicyclopentadiene diepoxide, limonene diepoxide, vinyl cyclohexane diepoxide, bis(3,4-epoxycyclohexyl) adipate, 3,4-epoxycyclohexyl methyl-3,4-epoxy-cyclohexane carboxylate, and 2-(3,4-epoxycyclohexyl-5,5-spiro-3,4-epoxy) cyclohexane-metadioxane, and the like.

Thus, it will be readily apparent that appropriate resins include vinyls, acrylics, polyesters, polyurethanes, epoxies, silicones, polyethers, polysulfides, polysulfones, and the like.

Alternatively, an aliphatic hydroxyl-functional resin can be dispersed in an epoxy diluent, or an epoxy resin can be dispersed in a polyol diluent for providing the requisite functionalities. Of course, the single resin bearing both functionalities also can be cut in a diluent bearing aliphatic hydroxyl or oxirane functionality. By diluent is meant that a monomer, oligomer, or polymer of suitable viscosity for being a diluent or solvent (i.e. continuous phase) is provided with the requisite functionality. Of course, non-functional solvents or diluents can be provided alternatively or in addition to reactive diluents.

As noted above, the novel selective capping synthesis of the present invention is most applicable to resins which are higher in functionality, e.g. a functionality of 2 or more and typically of 4 or more functional groups per molecule. For performance, higher functional acrylic resins are ideally suited for use in the partial capping synthesis of the present invention.

Carboxyl-functional capping agents can be monomeric, oligomeric, or even polymeric on occasion. Suitable monomeric capping agents include, for example, diphenolic acid, hydroxybenzoic acids (e.g. para-hydroxybenzoic acid, meta-hydroxybenzoic acid, and ortho-hydroxybenzoic acid or salicylic acid), thiosalicyclic acid, mercapto acetic acid, mercapto propionic acid, para-hydroxyphenylacetic acid and the like and mixtures thereof. Alternatively, capping adducts can be formed between, for example, a dimercapto compound and compound containing carboxyl functionality and functionality reactive with a mercapto group such as ethylenic unsaturation or the like. A variety of reaction schemes can be envisioned for forming such speciality adduct capping agents, though for economy monomeric capping agents are preferred.

The selective capping synthesis involves the reaction of the carboxy capping agent with the one or more resins under reaction conditions and for a time such that the capping agent selectively reacts with the oxirane functionality to the substantial exclusion of the aliphatic hydroxyl functionality. Reaction temperatures for this synthesis broadly comprehend temperatures ranging from about 75° to 175° C. and advantageously between about 140° and 160° C. Reaction times, correspondingly, range from about 15 minutes to about 3 hours with reaction times ranging from about 1-2 hours being preferred. As a practical matter, the progress or completeness of the reaction is adjudged by monitoring the acid value of the reaction mixture as the acid value is a convenient indicator easily monitored during the course of the reaction. When the acid value is less than 10, the reaction typically is adjudged to be complete. Thereafter, the reaction mixture is cooled and is ready for use in formulating a variety of products including, for example, coating compositions, caulks, adhesives, sealants, foundry binders, or the like.

In vapor permeation curable uses of the resinous product, a polyisocyanate cross-linking agent is utilized to cross-link with the hydroxyl groups or mercaptan groups of the resin under the influence of a catalyst to cure the coating. Aromatic, aliphatic, or mixed aromatic/aliphatic isocyanates may be used. Of course, polymeric isocyanates are employed in order to reduce toxic vapors of isocyanate monomers. Further, alcohol-modified and other modified isocyanate compositions find utility in the invention. Multi-isocyanates preferably will have from about 2-4 isocyanate groups per molecule for use in the coating composition of the present invention. Suitable multi-isocyanates for use in the present invention include, for example, hexamethylene diisocyanate, 4,4'-toluene diisocyanate (TDI), diphenylmethane diisocyanate (MDI), polymethyl polyphenyl isocyanate (Polymeric MDI or PAPI), m- and p-phenylene diisocyanates, bitolylene diisocyanate, triphenylmethane triisocyanate, tris-(4-isocyanatophenyl) thiophosphate, cyclohexane diisocyanate (CHDI), bis-(isocyanatomethyl) cyclohexane ($H_6$XDI), dicyclohexylmethane diisocyanate ($H_{12}$MDI), trimethylhexane diisocyanate, trimethyl hexamethylene diisocyanate, dimer acid diisocyanate (DDI) e.g. lysine diisocyanate and its methyl ester, isophorone diisocyanate, methyl cyclohexane diisocyanate, 1,5-napthalene diisocyanate, triphenyl methane triisocyanate, xylylene diisocyanate and methyl and hydrogenated derivatives thereof, polymethylene polyphenyl isocyanates, chlorophylene-2,4-diisocyanate, and the like and mixtures thereof. Aromatic and aliphatic polyisocyanate dimers, trimers, oligomers, polymers (including biuret and isocyanurate derivatives), and isocyanate functional prepolymers often are available as preformed packages and such packages are suitable for use in the present invention also.

The ratio of isocyanate equivalents of the polyisocyanate cross-linking agents to the hydroxyl groups from the hydroxy resinous materials preferably should be greater than about 1:1 and can range from about 1:2 on up to about 2:1. The precise intended application of the coating composition often will dictate this ratio or isocyanate index.

As noted above, a solvent or vehicle may be included as part of the coating composition. Volatile organic solvents may include ketones and esters for minimizing viscosity, though some aromatic solvent may be necessary and typically is part of the volatiles contained in commercial isocyanate polymers. Representative volatile organic solvents include, for example, methyl ethyl ketone, acetone, ethyl 3-ethoxypropionate, methyl isobutyl ketone, ethylene glycol monoethyl ether acetate (sold under the trademark Cellosolve acetate), and the like. Organic solvents commercially utilized in polyisocyanate polymers include, for example, toluene, xylene, and the like. It should be noted that the effective nonvolatile solids content of the coating composition can be increased by incorporation of a relatively low or nonvolatile (high boiling) ester plasticizer which is retained for the most part in the cured film. Such suitable ester plasticizers include, for example, dibutyl phthlate, di(2-ethylhexyl) phthlate (DOP), and the like. The proportion of ester plasticizer should not exceed about 5-10% by weight, otherwise loss of mar resistance can occur.

The coating composition additionally can contain opacifying pigments and inert extenders such as, for example, titanium dioxide, zinc oxide, clays such as kaolinite clays, silica, talc, carbon or graphite (e.g. for conductive coatings), and the like. Additionally, the coating compositions can contain tinctorial pigments, corrosion-inhibiting pigments, and a variety of agents typically found in coating compositions. Such additional additives include, for example, surfactants, flow or leveling agents, pigment dispersants, and the like.

As to the performance requirements which are met by the coating composition, it should be noted that the coating composition can be formulated to have a minimum pot life of at least 4 hours in an open pot and generally the coating can be formulated to have a pot life which exceeds 8 hours and can range up to 18 hours or more. Such extended pot life means that refilling the pot at the plant during shifts generally is not required. Moreover, the pot life of the coating composition in a closed container can exceed one day depending upon formulation of the coating composition. After storage of the coating composition, the stored composition can be cut to application viscosity with suitable solvent (if required) and such composition retains all of the excellent performance characteristics which it initially possessed.

The amine activator can be supplied in the liquid phase or the vapor phase and preferably will be a tertiary amine including, for example, tertiary amines containing substituents such as alkyl, alkanol, aryl, cycloaliphatic, and mixtures thereof. Additionally, heterocyclic tertiary amines may be suitable for use in the invention also. Representative tertiary amines include, for example, triethyl amine, dimethyl ethyl amine, tetramethyl ethylene diamine, trimethyl amine, tributyl amine, dimethyl benzyl amine, dimethyl cyclohexyl amine, dimethyl ethanol amine, diethyl ethanol amine, triethanol amine, pyridine, 4-phenylpropyl pyridine, 2,4,6-collidine, quinoline, tripropyl amine, isoquinoline, N-ethyl morpholine, triethylene diamine, and the like and mixtures thereof. Additionally, it is conceivable to use amine oxides and quaternary ammonium amines. A myriad of proprietary tertiary amine activators currently are available and should function in the process additionally. While the amine activator preferably will be a tertiary amine and preferably presented as a vaporous tertiary amine, it will be appreciated that the tertiary amine may be presented as a liquid and the present invention function effectively and efficiently. Further, primary and secondary amines also activate the tin/mercaptan catalyst complex, though they are not preferred since longer cure times are experienced therewith. Still, highly-hindered secondary amines may find utility, and may even be preferred, on occasion. Such non-tertiary amines which may be used include, for example, diisopropyl amine, di-t-butyl amine, dibutyl amine, t-butyl amine, diisopropyl amine, 1,1-dimethyl propyl amine, monoethanol amine, diethanol amine, and the like and mixtures thereof.

While the proportion of amine activator may range on up to 6 percent or more, percentages of less than 1 volume percent typically will suffice, e.g. between 0.25 and 1 percent by volume. It will be appreciated that the proportion of amine activator will vary depending upon whether the amine activator is presented in its liquid state or in its vaporous state, and whether the amine activator is tertiary, primary, or secondary. Generally speaking, the proportion of liquid amine activator generally will be greater in concentration than with the amine activator supplied as a vapor, though this can vary. The same is true for the primary and secondary amines which require a greater level, apparently due to their reactivity in the system.

A variety of substrates can be coated with the coating compositions of the present invention. Substrates include metal, such as, for example, iron, steel, aluminum, copper, galvanized steel, zinc, and the like. Additionally, the coating composition can be applied to wood, fiberboard, RIM, SMC, vinyl, acrylic, or other polymeric or plastic material, paper, and the like. Since the coating compositions can be cured at room temperature, thermal damage to thermally-sensitive substrates is not a limitation on use of the coating compositions of the present invention. Further, with the ability to use the vaporous amine catalyst spray method, the flexibility in use of the coating compositions of the present invention is enhanced even further. It should be undrstood, however, that heating of the coating composition following application (e.g. between about 50° and 150° C.) often is recommended for enhancing solvent explusion. In fact, heating at conventional curing temperatures even may be practiced on occasion.

Additionally, the formation of a tin/mercaptan complex as disclosed in commonly-assigned, copending application Ser. No. 06/844,810, filed Mar. 27, 1986 now abandoned, may be adapted when mercapto functionality is contained in the resinous product of the present invention. Of course, the use of mercapto-functional resins in vapor permeation curable coatings is taught in commonly-assigned, copending application Ser. No. 905,700 filed Sept. 9, 1986, now U.S. Pat. No. 4,753,825.

The following examples show how the present invention can be practiced but should not be construed as limiting. In this application, all percentage and proportions are by weight, unless otherwise expressly indicated. Also, all units are in the metric system and all citations referred to herein are expressly incorporated herein by reference.

EXAMPLES

EXAMPLE 1

Ethyl 3-ethoxypropionate (250 g, EEP) was charged to a one liter, three-neck flask equipped with a reflux condenser, thermometer, nitrogen inlet, stainless steel stirrer, monomer feed inlet, and initiator feed inlet. The EEP was heated to reflux (165° C.) under a nitrogen blanket while being stirred. The heated EEP was added 10% of an initiator solution of 6.6 g. of di-t-butyl peroxide in 50 g. of EEP solvent. Immediately, the monomer mix and initiator solution feeds were commenced through their respective inlets. The monomer mix consisted of 85.8 g. (0.66 mole) of hydroxyethyl methacrylate, 47 g. (0.33 mole) of glycidyl methacrylate, 384 g. (3 moles) of isobutyl acrylate, and 142 g. (1 mole) of butyl methacrylate. All of the monomer mix and 80 percent of the initiator solution were fed over a one hour time interval while the flask contents were maintained at 165° C. The contents of the flask then were held for 15 minutes at 165° C. and 5% of the initiator solution added. The flask contents again were held for one hour at 165° C. after which the last 5 percent of the initiator solution was added. After another two hours of heating at 165° C., the Stage 1 polymer solution was cooled to 150° C. and 94.4 g. (0.33 mole) of diphenolic acid was added in a Stage 2 reaction. The stage 2 reaction was completed by an additional two hour heating time period at 150° C. The dual functionality acrylic polyol resin solution analyzed to have the following physical constants:

OH Number=87.4 (theory=87.9)
Acid Value=5.7

% Non-Volatiles=71.6 wt.-% (theory=71.1 wt.-%)
Viscosity=20.2 stokes
% Water=0.02 wt.-%
Gardner Color=1
Density=8.76 lb/gal.

The resin contained 40 mole-% phenolic hydroxyl content, 20 mole-% secondary hydroxyl group content, and 40 mole-% primary hydroxyl group content based on the foregoing physical constants. No water was formed during the Stage 2 reaction. Thus, the selectivity of capping the acrylic resin solely through the oxirane functionality to the exclusion of the hydroxyl functionality of such acrylic resin has been demonstrated.

EXAMPLES 2-11

Additional dual functionality acrylic polyol resins were prepared in the manner set forth in Example 1. The solvent again was EEP and the initiator solution again was di-t-butyl peroxide. The monomer composition and mole ratio of monomers, capping agent utilized, and physical constants of the resulting acrylic polyol are set forth in the following table.

EXAMPLE 12

Methyl-n-amyl ketone (500 g, MAK) was charged into a 2-liter, 3-neck flask equipped with a reflux condenser, thermometer, nitrogen, inlet, stainless steel stirrer, monomer feed inlet, and initiator feed inlet. The MAK was heated under a nitrogen blanket with stirring to 150° C. (reflux). The initiator solution utilized consisted of 7.3 g of di-t-butyl peroxide in 50 g of MAK solvent. 10% of the initiator solution was added to the flask. Immediately, the monomer mix and initiator solution feeds were started. The monomer mix consisted of 130 g (1 mole) of hydroxyethyl methacrylate, 71 g (0.5 mole of glycidyl methacrylate, 384 g (3 moles of n-butyl acrylate, and 142 g (1 mole) of n-butyl methacrylate. All of the monomer mix and 80% of the initiator solution were fed to the flask during a one hour time interval during which the flask contents were maintained at 150° C. The solution then was held for an additional 15 minutes at 150° C. following which an additional 5% of the initiator solution was added. The solution was maintained for an additional one hour at 150° C. after which

TABLE 1

| Example | Stage 1 Monomer Composition | Mole Ratio | Stage 2 Capping Agent | OH # CALCD | OH # Found | AV | H$_2$O (%) | NV (%) | Hydroxyl Type (Mole %) Phenolic | 2° OH | 1° OH |
|---|---|---|---|---|---|---|---|---|---|---|---|
| 2 (4431-114) | BA HEMA GMA | 3 1 0.15 | DPA | 100 | 101 | 8.1 | 0.06 | 72.4 | 20.7 | 10.3 | 69.0 |
| 3 (4513-92) | BA HEMA GMA | 3 1 0.15 | PHBA | 92.1 | 92.0 | 7.4 | 0.01 | 71.5 | 11.5 | 11.5 | 77.0 |
| 4 (4603-5) | IBA GMA HEMA GMA | 2.75 1 0.66 0.33 | DPA | 92.4 | 92.2 | 5.5 | 0.03 | 72.5 | 40 | 20 | 40 |
| 5 (4603-18) | IBA MMA HEMA GMA | 2.75 1 0.66 0.33 | DPA | 96.5 | 96.1 | 6.0 | 0.03 | 71.5 | 40 | 20 | 40 |
| 6 (4603-23) | IBA TMCHMA HEMA GMA | 2.5 0.5 0.66 0.33 | DPA | 102.0 | 101 | 5.0 | 0.1 | 72.3 | 40 | 20 | 40 |
| 7 (4603-44) | IBA Styrene HEMA GMA | 5.2 0.4 0.92 0.68 | PHBA | 92.9 | 90.2 | 7.6 | 0.02 | 74.9 | 30 | 30 | 40 |
| 8 (4599-80) | IBA IBOMA GMA | 7 1 1 | PHBA | 87.6 | 89.3 | 8.3 | | 70.6 | 33 | 33 | 34 |
| 9 (4599-80) | IBA IBOMA HEMA GMA | 3.13 0.90 0.66 0.66 | PHBA | 87.4 | 86.1 | 9.9 | | 70.0 | 33 | 33 | 34 |
| 10 (4599-72) | IBA HEMA GMA | 4.25 1 1 | PHBA | 107.6 | 107.0 | 8.3 | | 70.6 | 33 | 33 | 34 |
| 11 (4599-82) | IBA IBOMA HEMA GMA | 2.78 0.90 0.83 0.83 | PHBA | 106.9 | 105.9 | 4.9 | | 72.0 | 33 | 33 | 34 |

DPA = Diphenolic Acid
PHBA = p-Hydroxybenzoic Acid
BA = Butyl Acrylate
BMA = Butyl Methacrylate
IBA = Isobutyl Acrylate
HEMA = Hydroxyethyl Methacrylate
GMA = Glycidyl Methacrylate
IBOMA = Isobornyl Methacrylate
TMCHMA = Trimethylcyclohexyl Methacrylate
MMA = Methyl Methacrylate The high degree of predicatability and the selectivity are demonstrated by the entries in the foregoing table.

the remaining 5% of the initiator solution was added to the flask. After another 1.5 hours of heating at 150° C., 250 g of MAK solvent was removed by atmospheric distillation.

To the resulting Stage 1 polymer solution was added 69 g (0.5 mole) of p-hydroxybenzoic acid and the Stage 2 reaction completed by heating the flask contents for 2 hours at 150° C. The acrylic polyol resin solution (4433-193) had the following physical constants:

OH Number=104.6 (theory=101.7)
% Non-Volatiles=73% (theory=72.2%)
Viscosity=47.7 Stokes
% Water=0.04%
Gardner Color=1—
Density=8.5 lb/gal.

The resin solution contained 50 mole-% primary hydroxyl content, 25 mole-% phenolic hydroxyl content, and 25 mole-% secondary hydroxyl content based on the analysis. Again, the efficacy of the selective capping reaction of the present invention has been demonstrated.

EXAMPLE 13

A coating composition was prepared from the following ingredients:

| | |
|---|---|
| Resin No. 4431-193 (Example 12) | 55.2 g (0.1 mole) |
| Desmodur N-3390 polyisocyanate* | 21 g (0.1 mole) |
| Butyl acetate/EEP | 40 g (2/1 wt-ratio) |
| Solids | 50.9 wt % |
| Viscosity | 66 cps (Brookfield No. 3 spindle at 30 rpm) |
| Viscosity profile (pot life) Initial | 66 cps |
| 4 hours | 76 cps |
| 20 hours | 230 cps |

*An aliphatic isocyanate trimer based on hexamethylene diisocyanate, NCO content 20%, 90% solids in butyl acetate, equivalent weight of 210, Mobay Chemical Corporation, Pittsburgh, Pa.

The coating composition was sprayed onto aluminum panels (No. 303) at 0.5 vol-% dimethylethanol amine catalyst concentration utilizing the spray process disclosed in U.S. Pat. No. 4,517,222. For comparison, the coating composition also was sprayed with uncatalyzed air. Each of the panels was baked for 5 minutes at 250° F. after a two minute flash (standing at room temperature). Film properties then were recorded as follows:

TABLE 2

| Spray Type | Tack Free Hot/Mars | MEK Rubs 1 Hr | Sward Hardness 1 Hr | MEK Rubs 24 Hrs | Sward Hardness 24 Hrs |
|---|---|---|---|---|---|
| Amine catalyst | yes/no mars | 100+ softens | 10,11 | 100+ | 14,14 |
| Air spray | slightly tacky/mars slightly | 100 breakthrough | 5,5 | 100+ | 10,10 |

The above-tabulated data demonstrates the more rapid development of film properties utilizing the amine spray method. Moreover, this data demonstrates that the acrylic resin solution synthesized by the selective capping technique of the present invention is ideally suited for aminecatalyzed coating applications.

EXAMPLE 15

A white paint based on acrylic resin No. 4431-193 (Example 12) was prepared by forming a pigment grind which was ball milled overnight. The grind then was let-down with the remaining ingredients. The following table sets forth the ingredients used to make the grind and let-down for Part A of the paint (polyol) and Part B of the paint (polyisocyanate cross-linker phase):

TABLE 3

| Ingredient | Amount (g) |
|---|---|
| Part A | |
| Grind | |
| TiO$_2$ pigment | 500 |
| EEP | 50 |
| Butyl acetate | 100 |
| CAB-551-.001 | 10 |
| Resin No. 4431-193 | 150 |
| Let Down | |
| Resin No. 4431-193 | 400 |
| EEP | 50 |
| Tinuvin 292 | 2.7 |
| Tinuvin 328 | 2.7 |
| Byk 300 | 1.0 |
| Irganox 1010 | 0.5 |
| Part B | |
| Desmodur HL | 26.35 |
| Desmodur N-3390 | 45.65 |
| Methyl iso-butyl ketone | 21.48 |
| Hexyl acetate | 6.52 |
| White Paint Formulation | |
| Part A | 123.5 |
| Part B | 39 |
| Butyl acetate/EEP (2/1 wt-ratio) | 30 |
| VIC 5054 | 1.0 |
| FC-430 | 6 drops (25 wt % in methyl ethyl ketone) |
| Solids | 57.7 wt % |
| Pigment/Binder wt ratio | 0.8/1.0 |
| Viscosity Profile | |
| Initial | 66 cps |
| 4 hrs | 120 cps |

Tinuvin 292 - hindered amine light stabilizer, Ciba-Geigy Co.
Tinuvin 328 - hydroxy phenol benzotriazole light stabilizer, Ciba-Geigy Co.
CAB-551-.001 - Cellulose acetate butyrate, Eastman Chemical Co.
Byk 300 - silicone resin mar aid, Byk Chemie.
Irganox 1010 - hindered phenol type anti-oxidant, Ciba-Geigy Co.
Desmodur HL - an approximately tetrafunctional reaction product of hexamethylene diisocyanate and toluene diisocyanate (11.5% NCO content, equivalent weight of 365, 60% solids in butyl acetate, Mobay Chemical Corporation).
VIC 5054 - Blocked tin catalyst, Ashland Chemical Co.
FC-430 - non-ionic fluorocarbon surfactant used at 25% in MEK, Minnesota Mining & Manufacturing Company.

The white paint formulation was sprayed cured with 0.5 vol-% dimethyl ethanol amine concentration in the spray air onto 3003 aluminum panels. After a three minute flash, the panels were baked for 10 minutes at 180° F. The film properties resulting were recorded as follows:

TABLE 4

| White Paper | TFO/Mars | MEK Rubs 1 Hr | Sward Hardness 1Hr | MEK Rubs 24 Hrs | Sward Hardness 24 Hrs | Pencil Hardness 24 Hrs |
|---|---|---|---|---|---|---|
| 4603-42 | Yes | 100+ | 14,16 | 100+ | 16,16 | HB |

The above-tabulated data again demonstrates that the uniquely capped resins of the present invention are quite efficacious in formulating paints for amine-curing. Such paints develop rapid film properties which is quite advantageous, especially on a commercial line where the ability to handle the painted part very shortly following coating and cure translates into definite cost savings.

EXAMPLE 15

Coating No. 4603-50C was prepared as follows:

| Ingredient | Amount (g) |
|---|---|
| Resin No. 4603-44 | 62.2 (0.1 eq.) |

-continued

| Ingredient | Amount (g) |
|---|---|
| (Example 7) | |
| Desmodur N-3390 | 21.0 |
| Butyl acetate | 35 |
| EEP | 5 |
| FC-430 surfactant | 6 drops |
| % Solids | 53.1 wt % |
| Viscosity profile (Brookfield No. 3 spindle at 30 rpm) | |
| Initial | 58 cps |
| 4 hrs | 77 cps |
| 20 hrs | 142 cps |

The coating was spray cured utilizing 0.5% dimethylethanol amine catalyst concentration in the spray air. A comparison spray was done also with uncatalyzed air. Each coating composition was applied to Bonderite 1000 panels and, after a three minute flash, were baked at 180° F. for 10 minutes or 250° F. for 5 minutes. The resulting film properties were as follows:

TABLE 5

| Coating | Method | Bake Temp °F. | TFO/ Mars | 5 Min. MEK | 5 Min. Pencil | 1 Hr MEK | 24 Hrs Pencil | 24 Hrs MEK | 24 Hrs Pencil |
|---|---|---|---|---|---|---|---|---|---|
| 4603-50C | VIC | 180 10 min. | Yes Mars easily | 100+ softens | F | 100+ softens | F | 100+ | 3H |
| 4603-50C | Air | 180 10 min. | No tacky | 1 | Still tacky | 2 | 6B | 100+ softens | F |
| 4603-50C | VIC | 250 5 min. | Yes No Mars | 100+ | 2H | 100+ | 2H | 100+ | 3H |
| 4603-50C | Air | 250 5 min. | Yes Mars easily | 100+ softens | F | 100+ | F | 100+ | 2H |

The above-tabulated data again demonstrates that the unique selectively-capped resins of the present invention are useful in formulating coating compositions which are ideally suited for application and cure by amine catalyst spray techniques. Again, the early film development is demonstrated.

EXAMPLE 16

A Stage 1 epoxy/primary hydroxyl function acrylic resin was prepared as in Example 1 from the following ingredients: 382 g (3 moles) of n-butyl acrylate, 130 g (1 mole) of hydroxy ethyl methacrylate, and 42.6 g (0.3 mole) of glycidyl methacrylate. The monomers are dispersed at 70.3 wt-% non-volatile solids in EEP solvent. At the end of Stage 1, 0.8 g of a 50% hypophosphorous acid solution (oxygen scavenger) was added and the resin solution cooled to 150° C.

Stage 2 was conducted by the addition of 3-mercaptopropionic acid (26.5 g, 0.25 mole) and heating continued for an additional 1 hour at 150° C. The resulting resin No. 4497-163 had the following physical constants:
 OH Number=95.0 (theory=96.0)
 Acid Value=7.5
 % Non-Volatiles=70.4 (theory=71.9%)
 Viscosity=5.7 Stokes
 Gardner Color=1−
 Density=8.82 lb/gal.

This resin additonally contained 16.7 mole-% mercaptan functionality, 16.7 mole-% secondary hydroxyl functionality, and 66.6 mole-% primary hydroxyl functionality based on the foregoing analysis. This resin, then, is ideally suited for use in coatings applications in accordance with commonly-assigned, co-pending application Ser. No. 06/905,700, filed Sept. 9, 1986.

EXAMPLE 17

A Stage 1 epoxy-functional acrylic resin was prepared as in Example 1 from the following ingredients: 192 g (1.5 moles) of butyl acrylate, 142 g (1.0 mole) of butyl methacrylate, and 71 g (0.5 mole) of glycidyl methacrylate. The polymerization medium or solvent was 202.5 g (0.227 moles) of Pluracol TP-2540 polyether triol (OH#=63, BASF Wyandotte Corporation). After the last step of Stage 1, the resinous solution was cooled to 150° C.

Stage 2 was conducted by the addition of 141 g (0.493 mole) of diphenolic acid. Stage 2 was completed by heating for 1.5 hours at 150° C. EEP (30 g) was added prior to cooling of the Stage 2 resin. Resin No. 4431-176 possesed the following physical constants:
 OH Number=118 (theory=116.8)
 Acid Value=3.4
 % Non-Volatiles=89.8% (theory=90.2%)
 % $H_2O$=0.12%
 Gardner Color=2−
 Density=8.97 lbs/gal.

This viscous acrylic polyol in a polyether polyol solution contained 57.9 mole-% phenolic hydroxyl content, 28.9 mole-% secondary hydroxyl content, and 13.2 mole-% primary hydroxyl content with a weight ratio of acrylic polyol/polyether polyol of 2.7/1. Again, this dual resin solution is ideally suited for use in formulating coating compositions curable in the presence of vaporous tertiary amine catalysts.

EXAMPLE 18

A coating composition was prepared as follows:

| Ingredient | Amount (g) |
|---|---|
| Resin No. 4431-176 (Example 17) | 47.5 (0.1 eq.) |
| Desmodur N-3390 | 21.0 |
| Butyl acetate/EEP (2/1 wt-ratio) | 40 |
| FC-430 surfactant | 6 drops |
| % Solids | 56.7 wt % |
| Viscosity profile (Brookfield No. 2 spindle at 30 rpm) | |
| Initial | 66 cps |
| 4 hrs | 72 cps |
| 20 hrs | 104 cps |

This coating composition was sprayed cured with 0.5% DMEOLA catalyst concentration in the spray air. The coating was applied to glass and to 3003 aluminum panels, and baked for 5 minutes at 250° F. after a 2 minute flash period. Film properties were as follows:

TABLE 6

| Coating | TFO/Mars | MEK Rubs 1 Hr | Sward Hardness 1 Hr | MEK Rubs 24 Hrs | Sward Hardness 24 Hrs |
|---|---|---|---|---|---|
| 4431-195E | Yes/Mars easily | 100 softens | 6,6 | 100+ | 11,10 |

The above-tabulated data once again establishes the efficacy of the uniquely-capped resins of the present invention. Specifically, a resin solution of two different resins was utilized.

EXAMPLE 19

A Stage 1 epoxy-functional acrylic resin was prepared as in Example 1 from the following ingredients: 320 g (2.5 moles) of butyl acrylate and 71 g (0.5 mole) of glycidyl methacrylate. The polymerization medium or solvent was 531 g (2.22 eq.) of K-Flex 148 polyester polyol (OH#=235 King Industries). After the last step of Stage 1, the resin solution was cooled to 150° C. Stage 2 commenced upon the addition of 140 g (0.49 mole) of diphenolic acid and was completed upon a one hour heating time period at 150° C. The resin solution then was cut to 85 wt-% non-volatile solids content with EEP solvent prior to cooling. The physical constants of the resulting product were as follows:

OH Number=155 (theory=166)
Acid Value=6.6
% Non-Volatiles=84.7% (theory=85.0%)
Viscosity=80.2 Stokes
% Water=0.14%
Gardner Color=4—
Density=9.2 lb/gal.

The resin additionally contained 26.8 mole-% phenolic hydroxyl content, 13.5 mole-% secondary hydroxyl content, and 59.7 mole-% primary hydroxyl content. The weight ratio of acrylic polyol/polyester polyol was 1/1.

EXAMPLES 20-26

Additional acrylic polyols were prepared in polyester polyol media in a similar fashion to that set forth in Example 19. The following table sets forth the Stage 1 polymer composition, the Stage 2 capping agent, the polyester polymerization media, the weight ratio of acrylic polyol to polyester polyol, and the physical constants and mole-% of hydroxyl functionality for the resulting resinous product.

TABLE 7*

| Example | Stage 1 Monomer Composition | Stage 1 Mole Ratio | Stage 2 Capping Agent | Polymerization Media | Acrylic Polyol/Polyester Polyol | OH # CALCD | OH # Found | AV | H₂O (%) | NV (%) | Phenolic | 2° OH | 1° OH |
|---|---|---|---|---|---|---|---|---|---|---|---|---|---|
| 20 (4431-109) | BA GMA | 2.5 0.5 | DPA | Tone 0310 | 1/1 | 164 | 161 | 5.8 | 0.02 | 94.7 | 31.0 | 15.0 | 54 |
| 21 (4497-161) | BA GMA | 2.5 0.5 | 3-MPA | Tone 0310 | 1/1.2 | 126 | 124 | 9.2 | — | 77.7 | 18.0 (SH) | 18.0 | 64 |
| 22 (4603-43) | IBA Styrene GMA | 4.5 0.5 1.0 | PHBA | K-Flex | 2.85/1 | 114.6 | 108.4 | 7.8 | 0.07 | 73.6 | 30 | 30 | 40 |
| 23 (4574-80) | IBA GMA | 3.2 1.1 | PHBA | Aroplaz 6755 | 2.78/1 | 110.0 | 107.0 | 5.8 | — | 74.5 | 40.5 | 40.5 | 19.0 |
| 24 (4599-67) | IBA HEMA GMA | 3.26 .77 .70 | PHBA | Aroplaz 6755 | 2.78/1 | 92.6 | 95.5 | 6.7 | — | 73.9 | 32.0 | 32.0 | 36.0 |
| 25 (4599-69) | IBA HEMA GMA | 3.72 0.62 0.56 | PHBA | Aroplaz 6755 | 2.78/1 | 92.6 | 95.5 | 6.7 | — | 73.9 | 32.0 | 32.0 | 36.0 |
| 26 (4599-83) | IBA IBOMA HEMA GMA | 2.16 0.9 0.62 0.56 | PHBA | Aroplaz 6755 | 2.78/1 | 92.6 | 96.6 | 6.1 | — | 73.3 | 24.8 | 24.8 | 50.5 |

*0.2% 50% Hypophosphorous acid added during Stage 2. Abbreviations same as for Table 1.
Tone 0310 - Polycaprolactone triol, OH # = 185, Union Carbide Corp.
K-Flex 148 - Polyester polyol, OH # = 235, King Industries
Aroplaz 6755 - Polyester polyol, OH # = 88, 80% non-volatiles in PM acetate/toluene 65/35, NL Industries 3-MPA-3-mercaptopropionic acid Again, the high selectivity of Stage 2 capping agent toward the epoxy functionality in the Stage 1 resin was demonstrated with the primary hydroxyl functionality on the polyester and the epoxy functionality on the acrylic polymer.

EXAMPLE 27

Coating No. 4603-50B was made as follows:

| Ingredient | Amount (g) |
|---|---|
| Resin No. 4603-43 (Example 22) | 51.7 (0.1 eq.) |
| Part B of Example 14 | 35.5 (0.1 eq.) |
| Butyl acetate | 24 |
| EEP | 6 |
| FC-430 surfactant | 6 drops |
| % Solids | 49.7 |
| % Viscosity Profile (Brookfield No. 3 Spindle at 30 rpm) | |
| Initial | 53 cps |
| 4 Hrs | 75 cps |
| 22 Hrs | 900 cps |

This coating composition was sprayed cured with 0.5 DMEOLA catalyst concentration in the spray air. For comparison, the coating composition also was sprayed using uncatalyzed air. Each coating was applied to Bonderite 1000 panels and after a three minute flash were baked at 250° F. for 5 minutes. The film properties resulting were as follows:

TABLE 8

| Coating | Method | TFO/Mars | 5 Min. MEK | 5 Min. Pencil | 1 Hr MEK | 24 Hrs Pencil | 24 Hrs MEK | 24 Hrs Pencil |
|---|---|---|---|---|---|---|---|---|
| 4603-50B | Spray cure | Yes No mar | 100+ softens | 5B | 100+ | F | 100+ | 2H |
| 4603-50B | Air | No uncured | 1 | Uncured | 2 | Slightly tacky | 100+ | HB |

The above-tabulated data further demonstrates the uniqueness of the selective capping method and resulting resin in formulating coating compositions.

EXAMPLE 28

A 2 L three-neck flask was charged with 477.4 (1 mole) Kflex 188-50 (OH#-230, King Industries), 245 g (1 mole) Cardura E (glycidyl ester of Versatic acid, Shell Chemical Co.), 300 g dry MAK, and 286 g (1 mole) diphenolic acid. The mixture was stirred and heated at 150° C. for two hours to produce a clear, light amber resinous product with the following physical constants:

OH Number=215 (theory=214.3)
Acid Value=3.3
% Non-volatiles=74.3%
% Water=0.04%

Based on the above analysis the resin contained 40 mole % phenolic hydroxyl, 40 mole % 1° hydroxyl, and 20 mole % 2° hydroxyl. No water was formed during the reaction. Again the high selectivity of the synthesis has been demonstrated, but this time for an epoxy ester in an aliphatic polyester polyol.

I claim:

1. A method for synthesizing an aliphatic hydroxyl-functional resinous product which comprises:
   providing a resinous mixture comprising at least one resin which contains aliphatic hydroxyl functionality selected from primary hydroxyl functionality, secondary hydroxyl functionality, or both, at least one other resin which contains oxirane functionality,
   reacting said resinous mixture with a carboxyl functional capping agent bearing functionality selected from phenolic hydroxyl functionality, mercapto functionality, or both, and represented as follows:

$$R-\overset{O}{\underset{\|}{C}}-OH,$$

where R bears said functionality selected from phenolic hydroxyl functionality, mercapto functionality or both;
under conditions and for a time such that said carboxyl functionality of said capping agent selectively reacts with the oxirane functionality of said resinous mixture to produce a resinous product containing aliphatic hydroxyl functionality and containing functionality selected from phenolic hydroxyl functionality, mercapto functionality, or both, and represented as follows:

$$\sim\!\!\!\!\top\!\!\!\!\!-\!\!\!+\!(\underset{(OH)_y}{C}-CH-O-\overset{O}{\underset{\|}{C}}-R)_z,$$
$$\phantom{xxxxxxxxxxxx}|$$
$$\phantom{xxxxxxxxxxxx}A$$

where A is H or $$\sim\!\!\!\top\!\!\!\sim,$$
$$\phantom{xx}|$$
$$(OH)_b$$

where y and z are integers each independently varying from 1 to about 40, b is an integer ranging from 0 to about 40, and each wavy line represents an organic chain.

2. The method of claim 1. wherein said resinous mixture comprises an acrylic resinous mixture.

3. The method of claim 2 wherein said acrylic resinous mixture comprises four or more functional groups per molecule, said functional groups selected from aliphatic hydroxyl groups, oxirane groups, or both.

4. The method of claim 1. wherein said capping agent is selected from the group consisting of diphenolic acid, a hydroxy benzoic acid, thiosalicylic acid, mercapto acetic acid, mercapto propionic acid, parahydroxyphenylacetic acid, and mixtures thereof.

5. The method of claim 1. wherein said reacting is conducted under conditions comprising a temperature ranging from between about 75° and 175° C.

6. The method of claim 5 wherein said reaction temperature ranges from about 140° to 160° C.

7. The method of claim 1 wherein said reacting is conducted for a time adequate for the acid value of said resinous product to be not greater than about 10.

8. The method of claim 1 wherein said resinous mixture also comprises an organic solvent.

9. The method of claim 2 wherein said resinous mixture is provided by polymerizing a mixture of acrylic monomers prior to said reacting step.

10. The method of claim 1. wherein said reacting is conducted for a time ranging from about 15 minutes to about 3 hours.

11. The method of claim 1 wherein said resinous mixture also comprises a diluent which contains functionality selected from aliphatic hydroxyl functionality, oxirane functionality, or both.

* * * * *